United States Patent
Thompson et al.

(10) Patent No.: US 6,473,076 B1
(45) Date of Patent: Oct. 29, 2002

(54) APPARATUS AND METHOD FOR CONTROLLING THE POWER OF A HANDHELD COMPUTING DEVICE USING A STYLUS

(75) Inventors: Curtis D. Thompson, Taylorsville; Kenneth A. Croft, Salt Lake City; Jay B. McCleary, West Valley City, all of UT (US)

(73) Assignee: 3COM Corporation, Rolling Meadows, IL (US)

( * ) Notice: Subject to any disclaimer, the term of this patent is extended or adjusted under 35 U.S.C. 154(b) by 0 days.

(21) Appl. No.: 09/542,348

(22) Filed: Apr. 5, 2000

(51) Int. Cl.⁷ .................................................. G09G 5/08
(52) U.S. Cl. ...................... 345/179; 345/173; 178/19.01
(58) Field of Search .................................. 345/173, 179; 178/19.01–19.07, 18.01–18.11

(56) References Cited

U.S. PATENT DOCUMENTS

| | | | | | |
|---|---|---|---|---|---|
| 5,067,573 A | * | 11/1991 | Uchida | ........................ | 345/173 |
| 5,483,262 A | * | 1/1996 | Izutani | ........................ | 345/179 |
| 5,898,427 A | * | 4/1999 | Okamoto | ..................... | 345/179 |

* cited by examiner

*Primary Examiner*—Steven Saras
*Assistant Examiner*—William C. Spencer
(74) *Attorney, Agent, or Firm*—Baniak Pine & Gannon

(57) ABSTRACT

An apparatus and method for controlling the power of a handheld computing device with a stylus is provided. A handheld computing device includes a power "on" state and a power "off" state. The handheld computing device further includes an elongated slot for receiving a stylus, and a switch positioned within the slot for transitioning the handheld computing device from the power "on" state to the power "off" state when the stylus is inserted into the elongated slot.

16 Claims, 1 Drawing Sheet

APPARATUS AND METHOD FOR CONTROLLING THE POWER OF A HANDHELD COMPUTING DEVICE USING A STYLUS

FIELD OF THE INVENTION

This invention relates generally to the field of handheld computing devices and in particular, to an apparatus and method for controlling the power of a handheld computing device using a stylus.

BACKGROUND OF THE INVENTION

Conventional handheld computing devices such as, for example, the PalmPilot™ manufactured and sold by 3Com Corporation, of Santa Clara, Calif., typically include a touch sensitive display screen and a stylus. The stylus is a writing utensil that enables the operator to input data into the device via the display screen. The housing of these devices typically include an elongated slot, which is usually formed adjacent to a side wall of the housing, and extends downward from the top wall of the housing. The slot is configured to receive and house the stylus when the device is not in use.

When the stylus is fully inserted into the slot, the top of the stylus is usually flush with the top wall of the housing of the device. As a result, the stylus typically includes a flared tab portion adjacent its top end so that an operator has something to grasp to enable the removal of the stylus from the slot. The tab portion may even include rib portions to provide increased friction to further facilitate the removal of the stylus. Despite these attempts to make the removal of the stylus easier, the removal of the stylus can nonetheless be an awkward and difficult process.

Moreover, conventional handheld computing devices also typically include many manually operable input buttons including a conventional power switch, which enables the operator to transition power of the device from an "off" state to an "on" state and vice versa. To use the device, an operator has to depress the power switch to transition the device from the "off" state to the "on" state. When the operator is finished using the device, the operator has to depress the power switch to transition the device from the "on" state to the "off" state. However, oftentimes an operator may forget to depress the power switch to turn the device off, which in turn may result in the inadvertent draining of the batteries.

Accordingly, it would be desirable to have an apparatus and method for controlling the power of a handheld computing device using a stylus that overcomes the disadvantages described above.

SUMMARY OF THE INVENTION

One aspect of the invention provides an apparatus for controlling the power of a handheld computing device using a stylus. A handheld computing device includes a power "on" state and a power "off" state. The handheld computing device further includes an elongated slot for receiving a stylus, and a switch positioned within the elongated slot for transitioning the handheld computing device from the power "on" state to the power "off" state when the stylus is inserted into the elongated slot. The handheld computing device may preferably include a manually operable power switch and a latching mechanism extending into the elongated slot. The latching mechanism may preferably be in communication with the manually operable power switch. The stylus may preferably include a recess for receiving the latching mechanism. A spring may preferably be positioned within the elongated slot, and the spring may be in communication with the switch. The spring may preferably be positioned within the elongated slot between the switch and the stylus. The handheld computing device may also preferably include a first side, a second side, a top side, and a bottom side. The elongated slot may preferably extend from the top side in a direction toward the bottom side. The stylus may preferably include an end portion for contacting a spring. The stylus may preferably be an elongated member, and may preferably include a tab portion to allow the stylus to be removed from the elongated slot manually.

Another aspect of the invention provides a method of controlling the power of a handheld computing device with a stylus. A handheld computing device including a power "on" state and a power "off" state is provided. The handheld computing device further includes an elongated slot and a switch positioned within the elongated slot for transitioning the handheld computing device between the power "on" state and the power "off" state. A stylus is inserted into the elongated slot, and the switch is actuated. The handheld computing device is transitioned from the power "on" state to the power "off" state. The handheld computing device may also include a latching mechanism extending into the elongated slot. The stylus may preferably be retained within the elongated slot with the latching mechanism. The stylus may preferably include a recess, and the latching mechanism may preferably be received within the recess. A spring may preferably be positioned within the elongated slot, and the spring may preferably be in communication with the switch. The spring may preferably be contacted against the switch, and the spring may preferably be compressed. The stylus may preferably include an end portion, and the end portion may preferably be contacted against the spring.

Another aspect of the invention provides a method of controlling the power of a handheld computing device with a stylus. A handheld computing device including a power "on" state, a power "off" state, a manually operable power switch, an elongated slot and a latching mechanism extending into the elongated slot are provided. The latching mechanism retains a stylus positioned within the elongated slot, and the latching mechanism is in communication with the manually operable power switch. A switch and a spring are positioned within the elongated slot. The spring biases the stylus against the latching mechanism. The manually operable power switch is depressed, and the latching mechanism is released. The stylus is ejected from the elongated slot. The switch positioned within the elongated slot may preferably be actuated, and the handheld computing device may preferably transition from the power "off" state to the power "on" state. The spring may preferably be positioned between the stylus and the switch positioned within the elongated slot.

Another aspect of the invention provides a method of controlling the power of a handheld computing device with a stylus. A handheld computing device including a power "on" state, a power "off" state, a manually operable power switch, an elongated slot and a latching mechanism extending into the elongated slot are provided. The latching mechanism retains a stylus positioned within the elongated slot and is in communication with the manually operable power switch. A switch is positioned within the elongated slot for transitioning the handheld computing device from the power "off" state to the power "on" state. A spring is positioned within the slot, the spring biasing the stylus against the latching mechanism. The stylus is manually ejected from the elongated slot, and the latching mechanism is released. The switch is actuated, and the handheld computing device transitions from the power "off" state to the power "on" state. The spring may preferably be positioned between the stylus and the switch.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
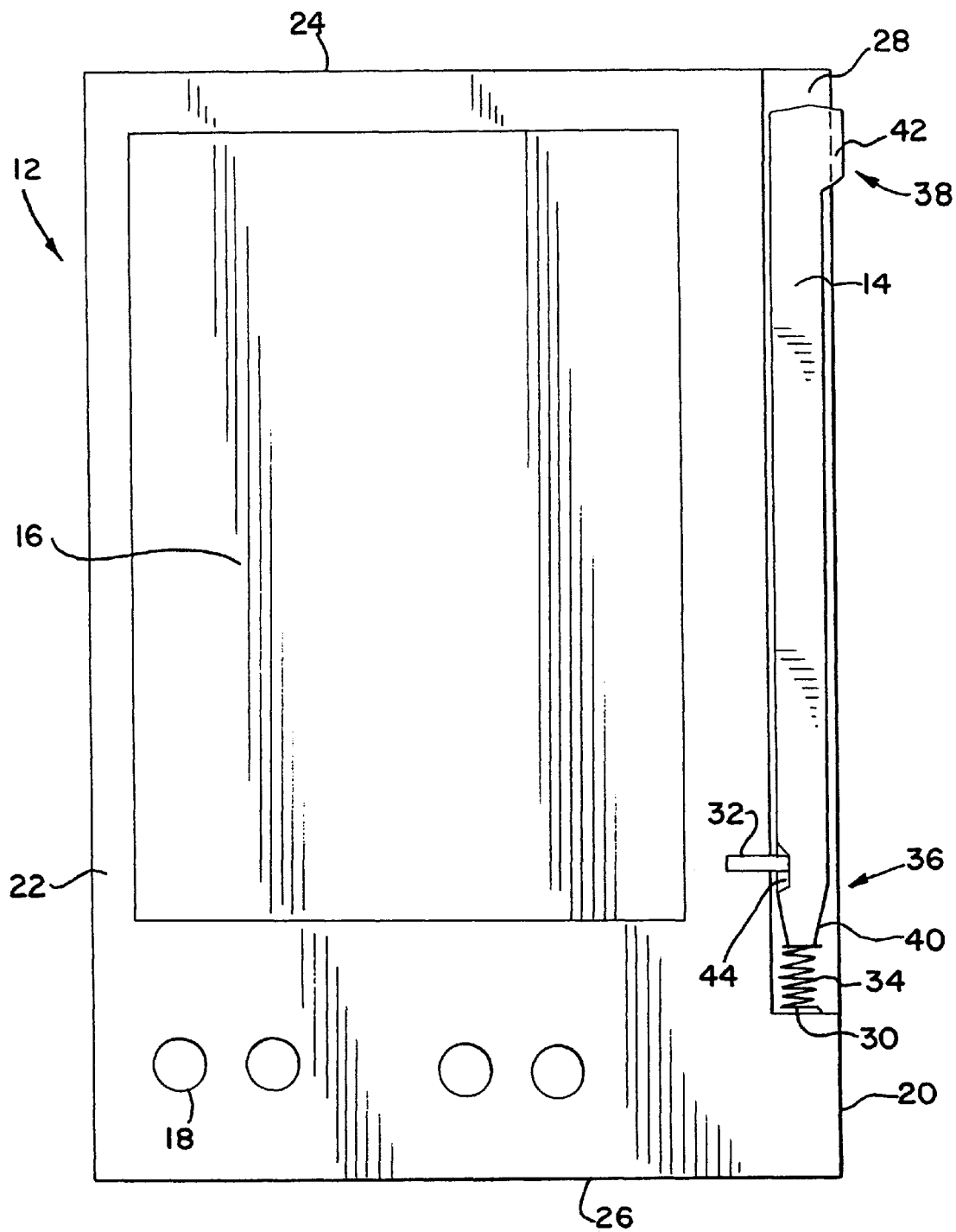
FIG. 1 is a partial sectional view of a preferred embodiment of an apparatus for controlling the power of a handheld computing device with a stylus that is made in accordance with the invention.

Referring to FIG. 1, a preferred embodiment of an apparatus 10 for controlling the power of a handheld computing device 12 using a stylus 14 is provided. The handheld computing device 12 may preferably be any one of the commercially available handheld computing devices such as, for example, the PalmPilot™ manufactured and sold by 3Com Corporation, of Santa Clara, Calif. The handheld computing device 12 may preferably include a touch activated display screen 16 and a manually operable power switch 18. The handheld computing device 12 may operate in two states, namely, a power "on" state and a power "off" state. The manually operable power switch 18 may preferably be any conventional switch used to transition the handheld computing device 12 from the power "off" state to the power "on" state and vice versa.

In the embodiment shown, the handheld computing device 12 includes an outer housing having a first side 20, a second side 22, a top side 24, and a bottom side 26. The handheld computing device 12 also includes an elongated slot 28 for receiving the stylus 14. In the embodiment shown, the elongated slot 28 is positioned adjacent to the first side 20 of the housing and extends downward from the top side 24 in a direction toward the bottom side 26. Those of ordinary skill in the art should appreciate that the slot 28 may alternatively be positioned adjacent to the second side 22 of the housing.

A switch 30 is positioned within the elongated slot 28. The switch 30 transitions the handheld computing device 12 from the power "on" state to the power "off" state and vice versa. For example, the switch 30 may transition the handheld computing device 12 from the power "off" state to the power "on" state when the stylus 14 is inserted into the elongated slot 28. Similarly, the switch 30 may transition the handheld computing device 12 from the power "off" state to the power "on" state when the stylus 14 is ejected from the slot 28. The switch 30 may preferably be any of the conventional switches that are capable of transitioning the handheld computing device 12 from the power "on" state to the power "off" state and vise versa depending upon whether the stylus 14 is being inserted into the slot 28 or is being ejected from the slot 28. For example, the switch 30 may preferably be any conventional mechanical switch such as, for example, a micro switch. Alternatively, the switch 30 may preferably be any conventional optoelectronic switch that can sense the position of the stylus 14 and transition the handheld computing device 12 between the power "on" state and the power "off" state depending upon the position of the stylus 14. It should be understood by those of ordinary skill in the art that the swtich 30 may preferably be enabled and/or disabled with any conventional software.

Referring again to FIG. 1, the handheld computing device 12 may also include a latching mechanism 32. The latching mechanism 32 may preferably be any conventional latching mechanism suitable for retaining the stylus 14. As shown in the embodiment of FIG. 1, the latching mechanism 32 may preferably extend into the elongated slot 28. When the stylus 28 is fully inserted into the slot 28, the latching mechanism 32 retains the stylus 14 securely in place within the slot 28.

The latching mechanism 32 may preferably be in communication with the manually operable power switch 18. For example, the latching mechanism 32 may preferably be electrically or mechanically coupled to the manually operable power switch 18 in any conventional manner. As a result, when the manually operable power switch 18 is depressed to transition the handheld computing device 12 from the power "off" state to the power "on" state, the latching mechanism 32 may simultaneously be released.

In the embodiment shown, a spring 34 may preferably be positioned within the slot 28. The spring 34 may be comprised metal and may be any conventional spring suitable for biasing the stylus 14 against the latching mechanism 32 when the stylus 14 is fully inserted into the slot 28. As shown in FIG. 1, the spring 34 is preferably in communication with the switch 30. In the embodiment shown, for example, the spring 34 is positioned within the slot 28 between the stylus 14 and the switch 30.

The stylus 14 may preferably be any structure that can be manually manipulated by an operator and that can be used to input information into the handheld computing device 12 by contacting the display screen 16 of the handheld computing device 12. In the embodiment shown, for example, the stylus 14 includes a first end 36 and a second end 38. The first end 36 of the stylus 14 includes an end portion 40 for contacting the spring 34. The second end 38 of the stylus 14 includes a tab portion 42 to facilitate the removal of the stylus 14 from the slot 28 manually. The stylus 14 may preferably include a recess 44 for receiving the latching mechanism 32. In the embodiment shown, for example, the recess 44 is formed adjacent to the first end 36 of the stylus 14, although the location of the recess 44 may vary depending upon the particular application.

In operation, the handheld computing device 12 may preferably be operating in the power "on" state and the operator may be using the stylus 14 to input various information into the handheld computing device 12. After the operator is finished using the handheld computing device 12, the operator inserts the stylus 14 into the elongated slot 28. When fully inserted, the end portion 40 of the stylus 14 may preferably contact the spring 34 and compress the spring 34. The spring 34 in turn contacts the switch 30 thereby actuating the switch 30. The actuation of the switch 30 causes the handheld computing device 12 to automatically transition from the power "on" state to the power "off" state. The advantage of this arrangement is that the handheld computing device 12 automatically and conveniently transitions from the power "on" state to the power "off" state when the stylus 14 is inserted into the slot 28 after use. As a result, the operator does not have to perform the additional step of actuating the manually operable power switch 18 to transition the device 12 to the power "off" state. This also prevents the inadvertent draining of the batteries that results from an operator's failure to depress the manually operable power switch 18 to transition the device 12 to the power "off" state.

When fully inserted into the slot 28, the stylus 14 may preferably be retained within the slot 28 by the latching mechanism 32. In particular, the latching mechanism 32 may preferably be received within the recess 44 of the stylus 14. When the stylus 14 is retained within the slot 28 by the latching mechanism 32, the compressed spring 34 biases the stylus 14 against the latching mechanism 32.

When the stylus 14 is fully inserted in the slot 28, the handheld computing device 12 is in the power "off" state, and the operator desires to use the device 12, the operator can depress the manually operable power switch 18. This in turn causes the latching mechanism 32 to release the stylus 14. The spring 34 ejects the stylus 14 from the elongated slot 28. The spring 34 may preferably cause the stylus 14 to be partially ejected from the slot 28, and the distance the stylus 14 is ejected depends upon the force generated by the spring 34 acting on the stylus 14. Partially ejecting the stylus 14 from the slot 28 makes it much easier for the operator to remove the stylus 14 from the slot 28. The release of the spring 34 in turn results in the actuation of the switch 30, which causes the handheld computing device 12 to transition from the power "off" state to the power "on" state. It should be understood by those of ordinary skill in the art that the manually operable power switch 18 may preferably function like any conventional power on/off switch. That is, the manually operable power switch 18 may preferably operate independent of the switch 30 positioned within the elongated slot 28. As a result, when the handheld computing device 12 is in the power "off" state, and the operator depresses the manually operable power switch 18, the handheld computing device 12 may transition from the power "off" state to the power "on" state in response to the actuation of the manually operable power switch 18.

Alternatively, the stylus 14 may be ejected from the slot 28 manually. For example, an operator may preferably grasp the tab portion 42 of the stylus 14 and manually eject the stylus 14 from the elongated slot 28. The force exerted by the operator may preferably be greater than the latching force of the latching mechanism 32 thereby causing the stylus 14 to disengage from the latching mechanism 32. The removal of the stylus 14 in turn causes the release of the spring 34, which results in the actuation of the switch 30. The actuation of the switch 30 in turn causes the handheld computing device 12 to transition from the power "off" state to the "on" state. The advantage of this arrangement is that the handheld computing device 12 transitions from the power "off" state to the power "on state automatically when the operator removes the stylus 14 from the slot 28.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. An apparatus for controlling the power of a handheld computing device using a stylus comprising:
    a handheld computing device including a power "on" state and a power "off" state, the handheld computing device further including an elongated slot for receiving a stylus, and a first switch positioned within the elongated slot for transitioning the handheld computing device from the power "on" state to the power "off" state when the stylus Is inserted into the elongated slot, a second switch, the second switch being manually operable to transition the handheld computing device to the power "on" and "off" states, a latching mechanism extending into the elongated slot, the latching mechanism in operable communication with the second switch such that when the second switch is depressed, the latching mechanism releases the stylus thereby allowing the stylus to be ejected from the elongated slot.

2. The apparatus of claim 1 wherein the stylus includes a recess for receiving the latching mechanism.

3. The apparatus of claim 1 further comprising a spring positioned within the elongated slot, the spring in communication with the first switch.

4. The apparatus of claim 3 wherein the spring is positioned within the elongated slot between the first switch and the stylus.

5. The apparatus of claim 1 wherein the handheld computing device includes a first side, a second side, a top side, and a bottom side, the elongated slot extending from the top side in a direction toward the bottom side.

6. The apparatus of claim 1 wherein the stylus includes an end portion for contacting a spring.

7. The apparatus of claim 1 wherein the stylus is an elongated member.

8. The apparatus of claim 1 wherein the stylus includes a tab portion to allow the stylus to be removed from the elongated slot manually.

9. The apparatus of claim 1 wherein the operable communication between the second switch and the latching mechanism includes a mechanical coupling.

10. The apparatus of claim 1 wherein the operable communication between the second switch and the latching mechanism includes an electrical coupling.

11. A method of controlling the power of a handheld computing device with a stylus comprising the steps of:
    providing a handheld computing device including a power on" state, a power "off" state, an elongated slot and a latching mechanism extending into the elongated slot, a first switch positioned within the elongated slot, the latching mechanism retaining a stylus positioned within the elongated slot, the latching mechanism in communication with a manually operable second power switch, a spring positioned within the elongated slot, the spring biasing the stylus against the latching mechanism;
    depressing the manually operable second power switch;
    releasing the latching mechanism; and
    ejecting the stylus from the elongated slot.

12. The method of claim 11 further comprising the steps of:
    transitioning the handheld computing device from the power "off" state to the power "on" state.

13. The method of claim 11 further comprising the steps of:
    actuating the first switch positioned within the elongated slot.

14. The method of claim 11 wherein the spring is positioned between the stylus and the first switch positioned within the elongated slot.

15. A method of controlling the power of a handheld computing device with a stylus comprising the steps of:
    providing a handheld computing device including a power "on" state, a power "off" state, a first switch positioned within an elongated slot of the device for transitioning the handheld computing device from the power "off" state to the power "on" state, a latching mechanism extending into the elongated slot, the latching mechanism retaining a stylus positioned within the elongated slot, the latching mechanism in communication with a manually operable second power switch, a spring positioned within the elongated slot, the spring biasing the stylus against the latching mechanism;

manually ejecting the stylus from the elongated slot;

releasing the latching mechanism, actuating the first switch; and transitioning the handheld computing device from the power "off" state to the power "on" state.

16. The method of claim 15 wherein the spring is positioned between the stylus and the first switch positioned within the elongated slot.

* * * * *